United States Patent
Wang et al.

(10) Patent No.: US 8,516,103 B2
(45) Date of Patent: Aug. 20, 2013

(54) METHOD FOR ACCESSING CONTROL THAT BASED ON VIRTUAL COMPUTING

(75) Inventors: Xiaojun Wang, Jiangsu (CN); Wei Jiang, Jiansu (CN); Dong Wu, Jiangsu (CN); Libin Sun, Jiangsu (CN); Haidong Pang, Jiangsu (CN); Zhiqiang Lu, Jiangsu (CN)

(73) Assignee: Linkage Technology Group Co., Ltd., Gulou District Nanjing, Jiangsu Province (CN)

( * ) Notice: Subject to any disclaimer, the term of this patent is extended or adjusted under 35 U.S.C. 154(b) by 251 days.

(21) Appl. No.: 13/108,877

(22) Filed: May 16, 2011

(65) Prior Publication Data

US 2011/0289418 A1    Nov. 24, 2011

(30) Foreign Application Priority Data

May 19, 2010    (CN) .......................... 2010 1 0177797

(51) Int. Cl.
*G06F 15/173* (2006.01)
*G06F 15/16* (2006.01)
*G06F 17/30* (2006.01)
*G06F 7/04* (2006.01)

(52) U.S. Cl.
USPC ........... 709/223; 709/224; 709/206; 707/769; 707/784; 726/4; 726/8; 726/30

(58) Field of Classification Search
USPC ......... 709/203, 206, 217, 223, 224; 715/736, 715/733, 835; 726/8, 30; 711/6; 707/602–825
See application file for complete search history.

(56) References Cited

U.S. PATENT DOCUMENTS

| | | | |
|---|---|---|---|
| 6,615,258 B1* | 9/2003 | Barry et al. | 709/223 |
| 8,336,095 B2* | 12/2012 | Lam et al. | 726/17 |
| 2008/0047023 A1* | 2/2008 | Lam et al. | 726/30 |
| 2009/0222925 A1* | 9/2009 | Hilaiel et al. | 726/25 |
| 2010/0281102 A1* | 11/2010 | Chinta et al. | 709/203 |
| 2011/0277027 A1* | 11/2011 | Hayton et al. | 726/8 |

* cited by examiner

*Primary Examiner* — Wing F Chan
*Assistant Examiner* — Raji Krishnan
(74) *Attorney, Agent, or Firm* — Global IP Services; Tianhua Gu (57) ABSTRACT

Construction of virtual environment, isolate the end user to interact directly with the core data sources, deploy the network listener engine in a virtual environment, using listening and interception technology, a variety of fine-grained authorization aggregates attribute information data to achieve the control of the end user to access core data sources. The present invention implements centralized control of remote maintenance authority, to Encapsulated client application packaged in a virtualized environment, control user access to core data sources, cut off end-users access to core data sources directly. Unify the interface of the maintenance path by virtual environment, standardized login path of maintenance personnel and maintenance tools.

1 Claim, 7 Drawing Sheets

Windows提供spi网络监控接口

```
int WSPAPI WSPConnect(SOCKET s,const struct sockaddr FAR * name,int namelen,LPWSABUF
lpCallerData,LPWSABUFlpCalleeData,LPQOS  lpSQOS, LPQOS lpGQOS,LPINT lpErrno);
int WSPAPI  WSPSend(SOCKET s,  LPWSABUF  lpBuffers,DWORD  dwBufferCount,LPDWORD
lpNumberOfBytesSent,DWORDdwFlags,LPWSAOVERLAPPED
lpOverlapped,LPWSAOVERLAPPED_COMPLETION_ROUTINE
lpCompletionRoutine,LPWSATHREADID lpThreadId,LPINT lpErrno);
```

Figure 6

| CCheckAcl |
|---|
| CProtocolInfo    m_ProtocolInfo;<br>CSession         m_Session;<br>CMemoryFile      m_MemoryFile; |
| int      CheckStartup();<br>void     CheckSocket(SOCKET s, int af, int type, int protocol);<br>void     CheckCloseSocket(SOCKET s);<br>int      CheckBind(SOCKET s, const struct sockaddr FAR *name);<br>int      CheckListen(SOCKET s);<br>int      CheckConnect(SOCKET s, const struct sockaddr FAR *name, int namelen);<br>int      CheckAccept(SOCKET s, SOCKET news);<br>int      CheckSend(SOCKET s, TCHAR *buf, int len, LPDWORD NumberOfBytesSent);<br>int      CheckSendTo(SOCKET s, const SOCKADDR *pTo, TCHAR *buf, int len, LPDWORD lpNumberOfBytesSent);<br>int      CheckRecv(SOCKET s, TCHAR *buf, int len, DWORD lpNumberOfBytesRecvd);<br>int      CheckRecvFrom  (SOCKET s, SOCKADDR *pFrom, TCHAR *buf, int len, LPDWORD lpNumberOfBytesRecvd);<br>CProtocolInfo*   GetProtocolInfo(){return &m_ProtocolInfo;}<br>CSession*        GetSession(){return &m_Session;}<br>CMemoryFile*     GetMemoryFile(){ return &m_MemoryFile;} |

Figure 7

METHOD FOR ACCESSING CONTROL THAT BASED ON VIRTUAL COMPUTING

CROSS REFERENCE TO RELATED PATENT APPLICATION

The present application claims the priority of Chinese patent application No. 201010177797.4 filed on May 19, 2010, which application is incorporated herein by reference.

FIELD OF THE INVENTION

The invention relates to the field of information security and telecommunications systems, particularly for special maintenance client of the telecommunications industry, which used access control methods based on virtual computing.

BACKGROUND OF THE INVENTION

Now, to Telecom operators, raise the level of centralization of maintenance and the need of rapid treatment to failure, maintenance personnel and third parties who access the core data using a variety of ways. Lack of effective means of control, new access ways, especially in remote maintenance by IP network, while enhancing the efficiency of maintenance work, greater security risks will be introduced, appropriate security incidents have occurred.

Figure 1:
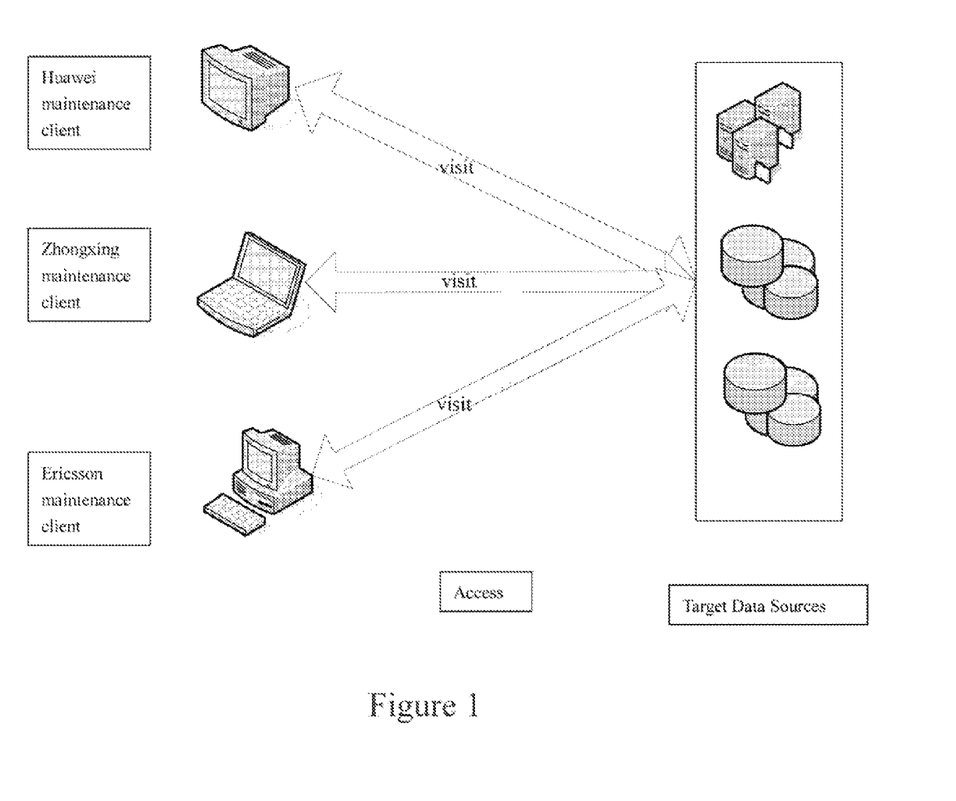
FIG. 1 shows the existing method of access control technology in the diagram.

Shown in FIG. 1, the existing technology to take Special maintenance Clients to access to core data sources by the various manufacturers, but this method has long been the lack of access control, special maintenance clients can access any client data, location data, exist security risk.

SUMMARY OF THE INVENTION

The invention proposed the access control method based on virtualized computing, the method using virtualization technology, integrated with the network listening technology and automatic synchronization of configuration data, the remote maintenance access control, to achieve concentration of different clients, fine-grained access control.

The invention proposed the access control method based on virtualized computing, includes the following steps: Construction of virtual environment, isolate the end user to interact directly with the core data sources, Unify the interface of the maintenance path by vrtual environment, standardized login path of maintenance personnel and maintenance tools; Deploy the network listener engine in a virtual environment engine, using listening and interception technology, a variety of fine-grained authorization aggregates attribute information data to achieve the fine-grained control of the end user to access core data sources. Real-time network monitoring engine in the virtual environment parsing the client operating, aggregating a variety of fine-grained authorization attribute information data, interception of data packets corresponding to realize the user access authority is minimized, that the least access to applications, smallest executable command set, the least access to means.

The access control method based on the virtual computing, including the following steps: Step 1, the end user to log on the virtual computing environment in web; Step 2, the computing environment judge whether the end-user is the first time to login, if not, Go to Step 3; otherwise prompted end-user to download the virtual environment control, go to Step 1; Step 3, start the virtual environment; Step 4, virtualization, end users from the policy cache to get a list of applications allowed, if successful, proceed to step 5; fails to pop up the blank browser; Step 5, in a virtualized environment can only display the icon of runnable client application; Step 6, the end user double-click the icon to launch one of the client software, and start a network listener engine; Step 7, the end-user operate the client application and produce a executive statement; Step 8, the network listener put the executive statement into cache in virtual computing environment ; Step 9, according to the contents of the cache, virtual environment judge the current statement is valid or not, if it is, go to Step 10, otherwise block the statement by network listening engine, go to Step 7; Step 10, sent Executive statement to the core sources by the virtual computing environment; Step 11, execute statement on core sources, echo of the results, go to Step 7, execute the next statement.

The effect of the invention is that it implements the centralized control of remote maintenance authority, Encapsulated maintain client application in a virtualized environment, control user directly access to core data. Isolated from end-user access to core data sources directly. Unify the interface of the maintenance path by virtual environment, standardized login path of maintenance personnel and maintenance tools.

Real-time network monitoring engine in the virtual environment parsing the client operating, aggregating a variety of fine-grained authorization attribute data, for example: time, user source IP, name(primary account), associate account, role, executable statement and so on. Interception of data packets corresponding to realize the user right is minimized, that the least access to applications, smallest executable commands, the least access to means, also to take decentralized control to privileged or shared accounts.

DETAILED DESCRIPTION OF THE INVENTION

To enable the above and the purposes, features and advantages of the invention can be understood more clearly, implementation examples is given, and with the drawings, details as follows.

Figure 2:
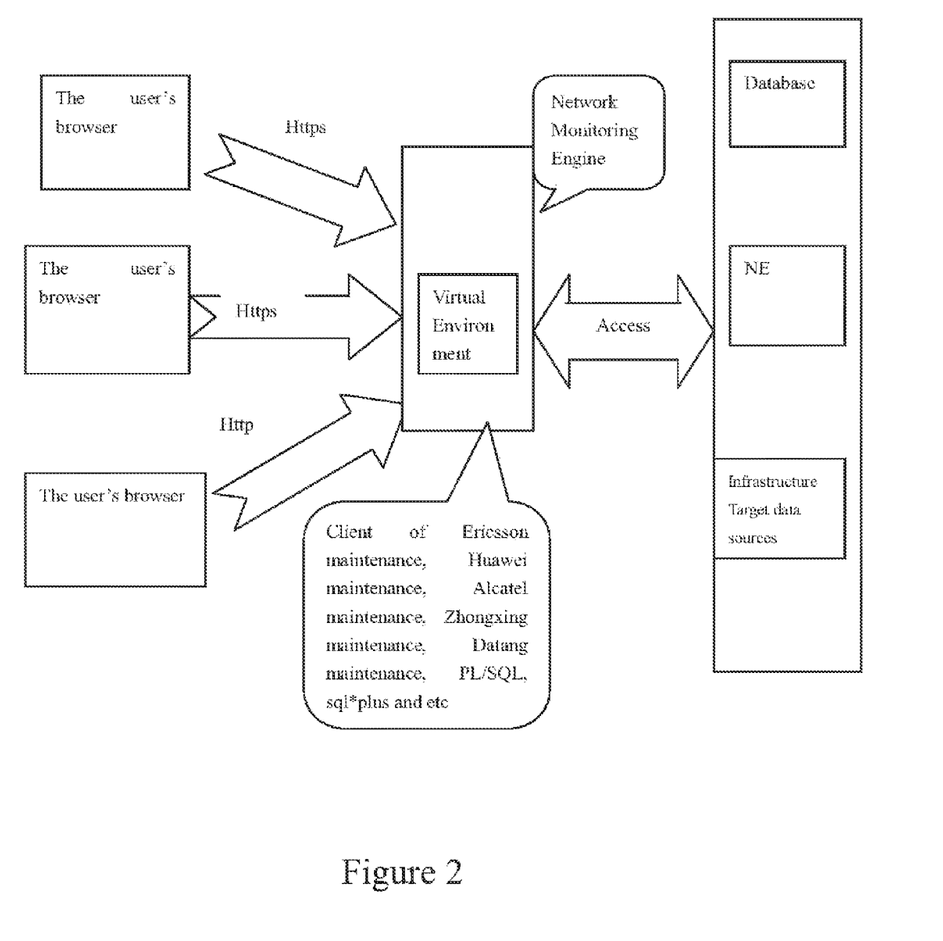
FIG. 2 shows the structure diagram of access control method based on virtual computing according to the invention.

Shown in FIG. 2, access control method based on virtual computing need to build a virtual environment, such as through Microsoft windows 2008 server to build virtual environment. In a virtualized environment the use of special maintenance client, for example, the client of Ericsson maintenance, Huawei maintenance, Alcatel maintenance, ZTE maintenance, Datang maintenance, PL/SQL, sql * plus and so on, publishing by web, push dedicated maintenance client to end-user,and the end-user can only through dedicated maintenance client of virtual environment to access to core data source.

Figure 6:
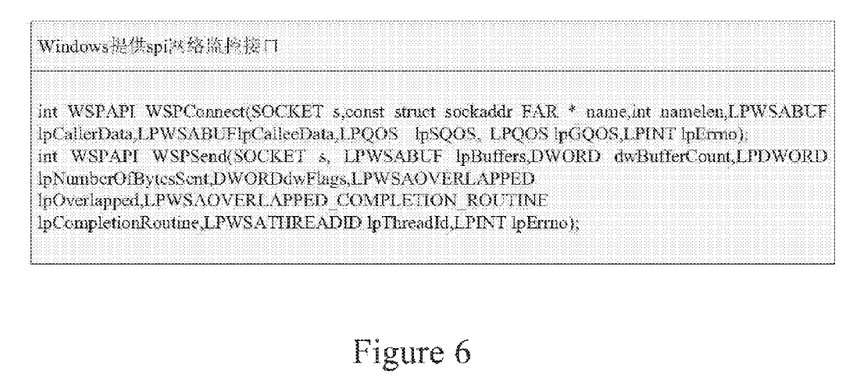
FIG. 6 shows the main data struct of network listening engine.
Figure 7:
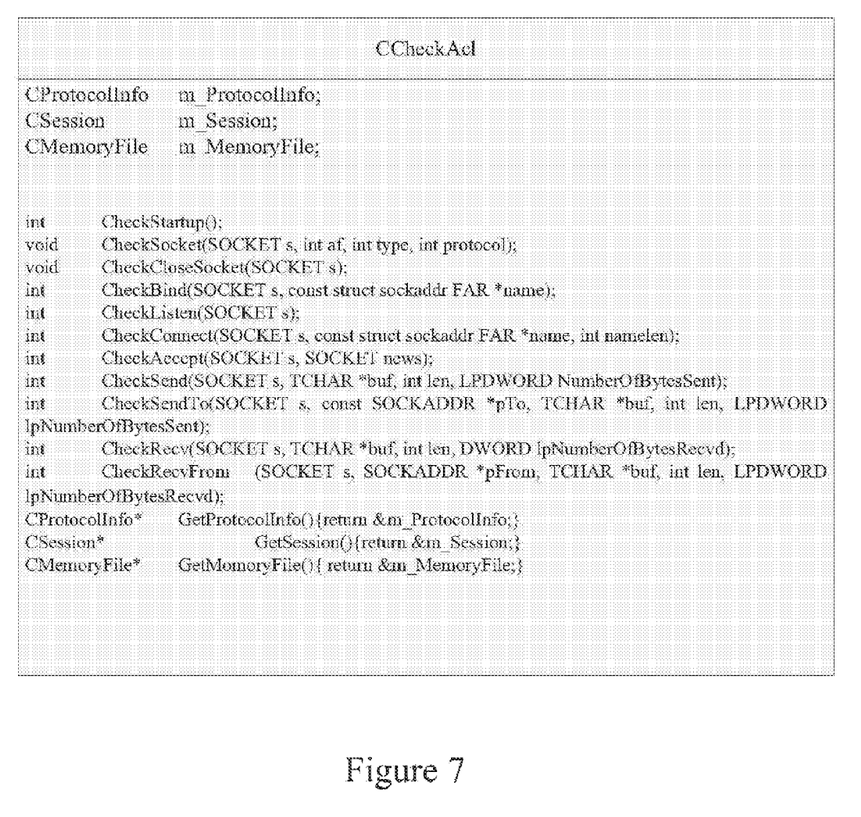
FIG. 7 shows the main data struct of block the network listening engine.

In a virtualized environment, the deployment of the network listening engine, network listening engine made of listening module and intercept module the data structure shown in FIGS. 6 and 7, all the operations of the maintenance clients (graphical or character) are analysised as network data packets. Under the authority of end-user, Network listening engine (the user allowed to execute the action statement) intercept corresponding data message in real time, allow or block executive statement of the client access to core data source.

Figure 3:
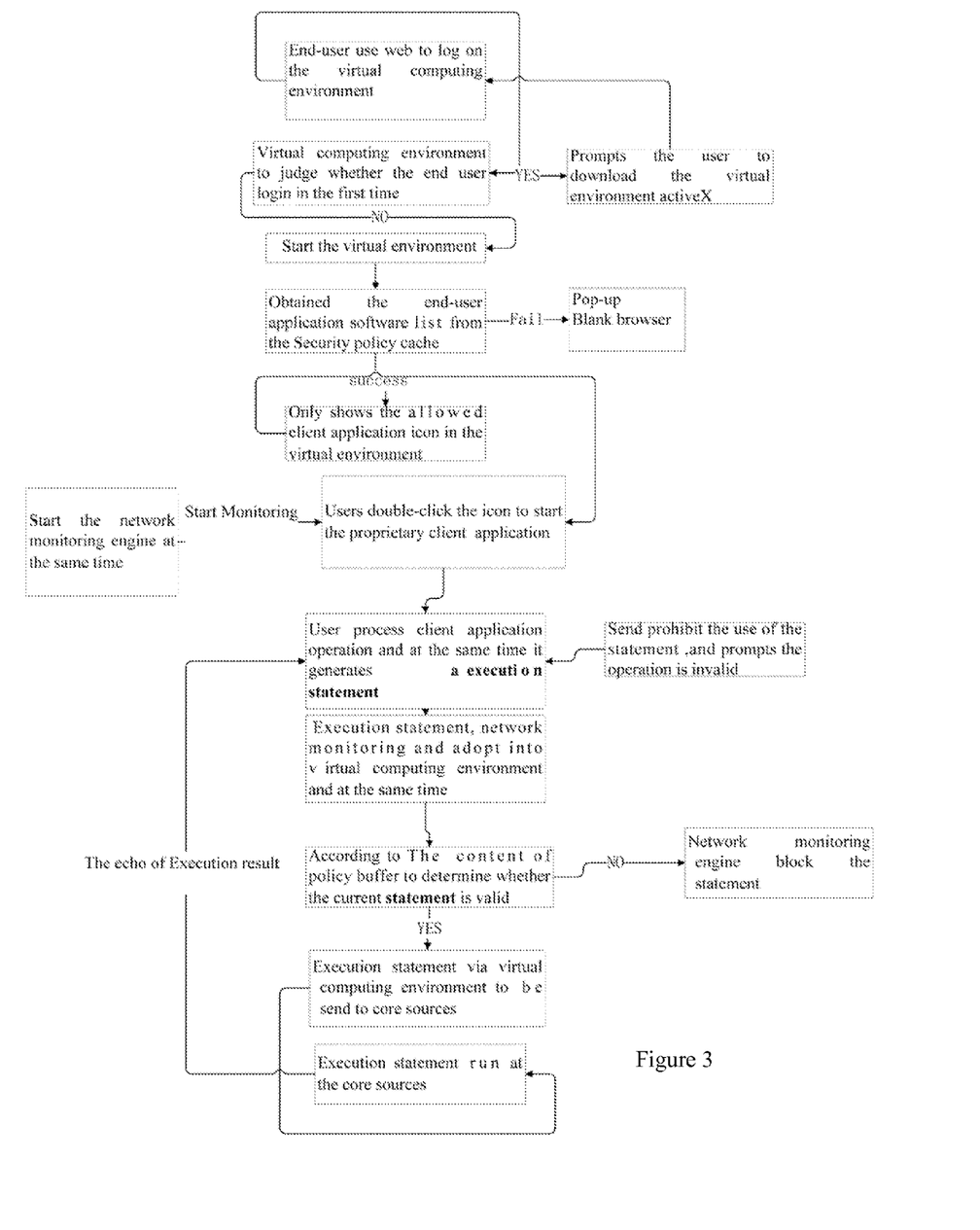
FIG. 3 shows the flow chart of access control method based on virtual computing according to the invention.

Shown in FIG. 3, the process steps of access control method based on the virtual computing as follows:

1. the end user to log on the virtual computing environment in web;
2. the computing environment judge whether the end-user is the first time to login, if not, Go to Step 3; otherwise prompted end-user to download the virtual environment control, go to Step 1;
3. start the virtual environment;
4. virtualization, end users from the policy cache to get a list of applications allowed, if successful, proceed to step 5; fails to pop up the blank browser;
5. in a virtualized environment can only display the icon of runnable client application (client maintenance of Ericsson, client maintenance of Huawei, client maintenance of Alcatel, client maintenance of ZTE, client maintenance of Datang, PL/SQL database, sql * plus database client);
6. the end user double-click the icon to launch one of the client software, and start a network listener engine; according to the interface provided by windows api, windows provides api monitoring interface. In order to communicate, every process in windows would load the interface, the main data structure shown in FIG. 6;
7. the end-user operate the client application and produce a executive statement;
8. the network listener put the executive statement into cache in virtual computing environment;
9. according to the contents of the cache, virtual environment judge the current statement is valid or not, if it is, go to Step 10, otherwise block the statement by network listening engine, go to Step 7;
10. sent Executive statement to the core sources by the virtual computing environment;
11. execute statement on core sources, echo of the results, go to Step 7, execute the next statement.

Figure 4:
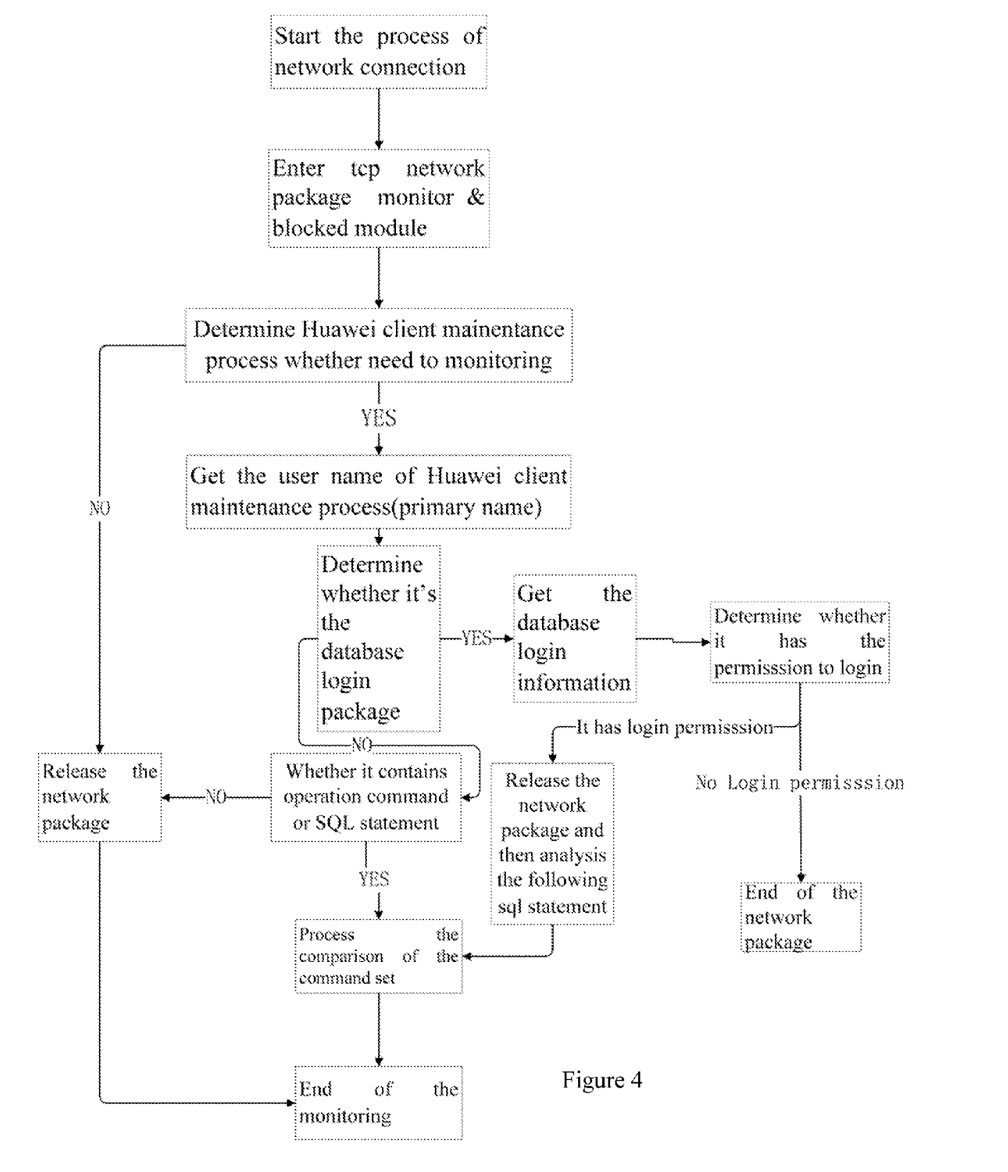
FIG. 4 shows the flow chart of access control method in the example according to the invention.

Binding to specific implementation case shown in FIG. 4, use access control method based on virtual computing to achieve Huawei maintenance client centralized, fine-grained authority control. Process steps as follows:

1. in virtual computing environment, start the connection process of network;
2. into tcp network packet monitoring and intercept module;
3. judge Huawei maintenance client process whether need to monitoring or not, is then go to step 4; or release of the network packet, stop tcp network packet monitoring;
4. Huawei maintain client process to obtain the user name (main account);
5. containing the username to determine whether the packet is a database login packet is then go to step 6; otherwise go to step 8;
6. access to Huawei's maintenance log on the client database information;
7. to judge the user, the source address, the client version whether has permissions to log on to the database; if it has, parsing the follow-up sql statement, go to step 9; otherwise block network packet, monitoring end;
8. judge the network packet whether has executive statement or SQL statement command, if it has, go to step 9; or release of the network packet, monitor end;
9. the operation statements or SQL statements, one by one put into the cache, enter "process comparison of command set", the process shown in FIG. 5;
10. monitoring end.

Figure 5:
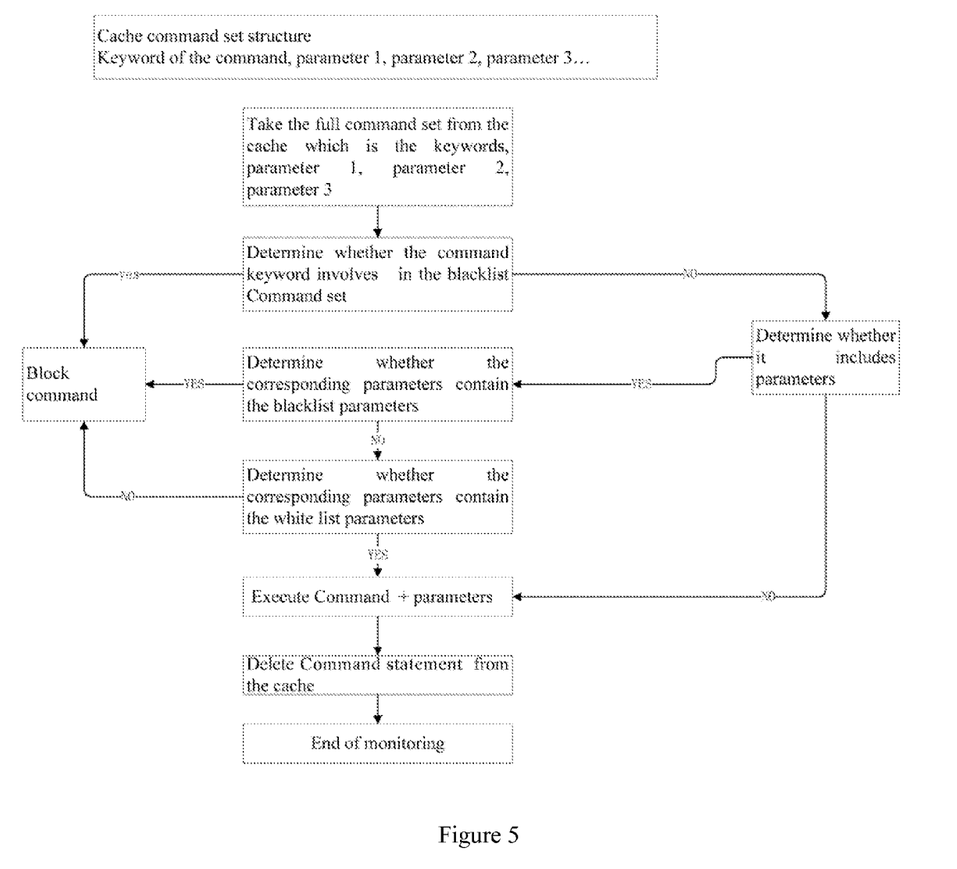
FIG. 5 shows a flow chart of Step 9 in FIG. 4.

Step 9 above, command set structure from the parsed operation command statement or SQL statement: the command keyword, parameter 1, parameter 2, parameter 3, "process comparison of command set", as shown in FIG. 5:

1. take a complete set of commands from the cache, that is the command keyword, parameter 1, parameter 2, parameter 3 . . . ;
2. judge the network packet whether has parameter, if it has, then transferred to Step 3; otherwise go to step 6;
3. judge command keyword whether contain commands from blacklist, (disabled commands, such as delete, rm, reboot), if contains, command blocked, go to step 7; otherwise go to step 4;
4. judge corresponding parameter whether contain parameter from blacklist (table name, column name), if contains, command blocked, go to step 7; otherwise go to step 5;
5. the corresponding parameters whether is contained in the allow list, if contains, transferred to Step 6; otherwise command blocked, go to step 7;
6. the command set+parameter to be executed;
7. statement from the cache will be cleared;
8. monitoring end.

The instructions above explained the entire work process of access control method based on virtual computing, which focuses on through policy cache to get the authority allowed application list, and the way to listening, comparation, intercepting for executive statements by network listening, all these based on virtual computing environment. The access control method is to carry around a virtual computing environment, what to do should be judged by access definition and developed by executive statements and analysis.

The specific implementation described in this case in the present invention is just a good case, not intended to limit the scope of the invention. Any equivalent changes and modifications according to the contents of the scope of the present invention should be used as the technical aspects of the invention.

What is claimed is:

1. A method for permission control based on virtual computing, the method comprising the following steps:
building a virtual environment; separating direct interactions between end users and core data sources; creating a single access point for maintenance paths through the virtual environment; standardizing maintenance stuff's login paths and maintenance tools;
deploying a network listener engine in the virtual environment; achieving a fine grained permission control for the end users to access the core data sources by applying listening and interception technologies to collect a variety of fine grained aggregate information of authorization attribute data; and
achieving the minimum cost of user access process through the network listener engine in the virtual environment by real-time analyzing end user's operations, collecting a variety of fine grained aggregate information of authorization attribute data, and intercepting the corresponding data packets;
wherein the method further comprises the following specific steps:

step 1, the end user logs in the virtual environment through web;

step 2, the virtual environment tells if the end-user logs in for the first time; if not, proceed to step 3; and if yes, prompt the end user to download a virtual environment control and proceed to step 1;

step 3, start the virtual environment;

step 4, the virtual environment retrieves the end user's authorized application list from a policy cache; if successful, proceed to step 5; and if not, pop up a blank browser;

step 5, only display runnable client application icons in the virtual environment;

step 6, the end user double-click an icon to launch one of the authorized client application software, and start a network listener engine;

step 7, the end user creates an executable statement during the client side operating process;

step 8, the executable statement is put into a cache in the virtual environment by the network listener engine;

step 9, the virtual environment tells if the current statement is legal according to the content of the policy cache; if legal, proceed to step 10; and if not, the network listener engine intercepts the statement and proceed to step 7;

step 10, the virtual environment sends the executable statement to the core sources; and step 11, the executable statement is executed on the core sources and the executed result is returned for display; and then proceed to step 7 to execute the next statement.

\* \* \* \* \*